United States Patent
Niermann, Jr.

(10) Patent No.: US 9,328,845 B1
(45) Date of Patent: May 3, 2016

(54) VALVE STEM LOCK AND METHODS OF USING SAME

(71) Applicant: Packard International, Inc., Conroe, TX (US)

(72) Inventor: James O. H. Niermann, Jr., Conroe, TX (US)

(73) Assignee: Packard International, Inc., Conroe, TX (US)

( * ) Notice: Subject to any disclaimer, the term of this patent is extended or adjusted under 35 U.S.C. 154(b) by 123 days.

(21) Appl. No.: 14/215,387

(22) Filed: Mar. 17, 2014

Related U.S. Application Data

(60) Provisional application No. 61/789,487, filed on Mar. 15, 2013.

(51) Int. Cl.
    *F16K 35/06*         (2006.01)
(52) U.S. Cl.
    CPC ..................................... *F16K 35/06* (2013.01)
(58) Field of Classification Search
    CPC .......... F16K 35/00; F16K 35/06; F16K 35/10
    USPC ............ 137/383, 385; 70/174–177, 179, 166, 70/232, 242–244
    See application file for complete search history.

(56) References Cited

U.S. PATENT DOCUMENTS

| | | | | |
|---|---|---|---|---|
| 1,099,280 | A | * | 6/1914 | Connolly ................ F16K 35/10 251/112 |
| 1,275,135 | A | * | 8/1918 | Cunningham .......... F16K 35/06 137/385 |
| 1,311,863 | A | * | 7/1919 | Deadmond ........... B60R 25/042 137/385 |
| 1,534,965 | A | * | 4/1925 | Keeler .................... F16K 35/06 137/384.2 |
| 1,582,627 | A | * | 4/1926 | Biddle .................... F16K 35/06 137/384.8 |
| 2,656,704 | A | * | 10/1953 | Mancuso ................ E05B 67/36 292/57 |
| 4,483,366 | A | * | 11/1984 | Labita .................... F16K 35/06 137/385 |
| 4,709,720 | A | * | 12/1987 | Russo .................... F16K 35/06 137/385 |

\* cited by examiner

*Primary Examiner* — Craig Schneider
*Assistant Examiner* — Daniel P Donegan
(74) *Attorney, Agent, or Firm* — Greenberg Traurig, LLP

(57) ABSTRACT

Valve stem locks include a plug element and a sliding latch disposed in a hole of the plug element. The latch includes a hole and is biased toward the locked position. A key inserted in a hole in the plug element moves the latch from the locked position until the hole of the latch is in alignment with the key. The key is then inserted into the hole of the latch until a notch on the key engages a lower portion of the latch. As a result, the latch is prevented from returning to its locked position. To allow the latch to return to its locked position, the key is removed by rotating the key to disengage the notch from the lower portion of the latch and sliding the key from the hole in the latch. Removal of the key frees the latch to return to its locked position.

3 Claims, 7 Drawing Sheets

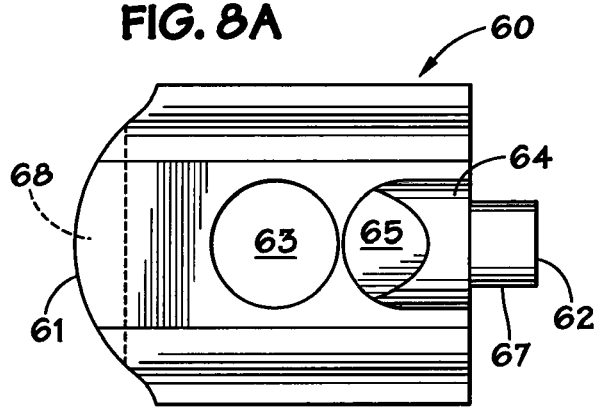
FIG. 8A
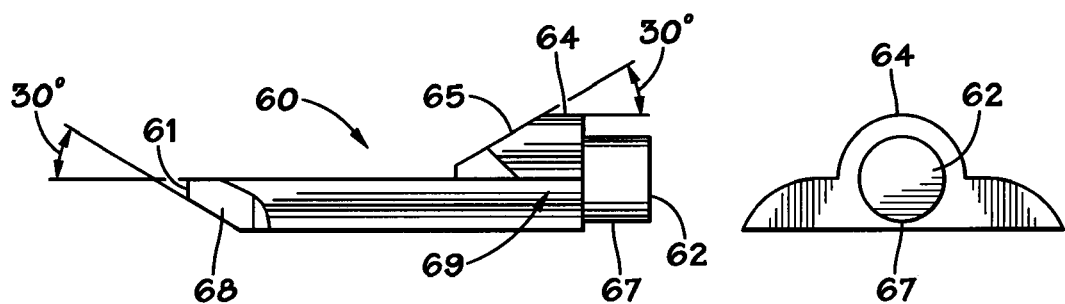
FIG. 8B  FIG. 8C
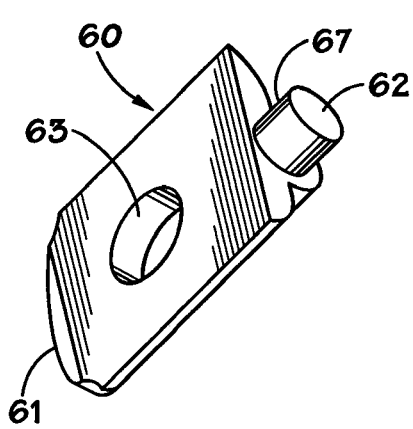 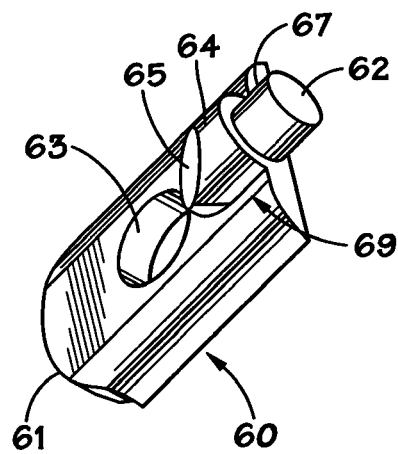
FIG. 8D  FIG. 8E

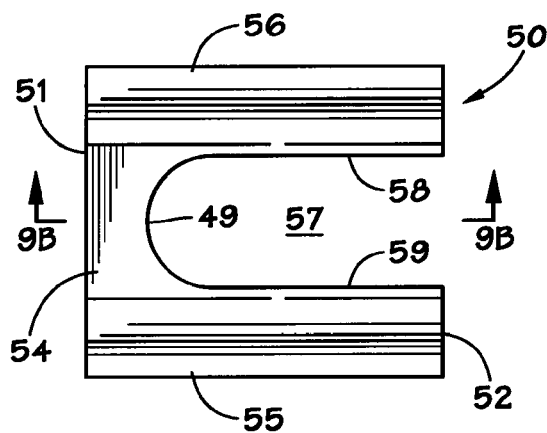
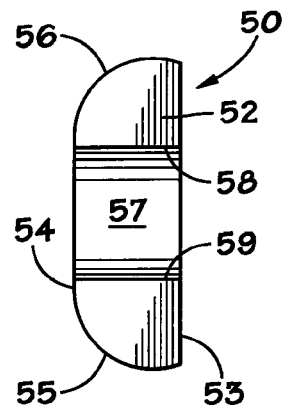
FIG. 9A    FIG. 9C
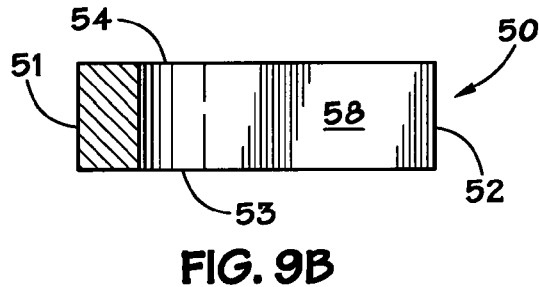
FIG. 9B
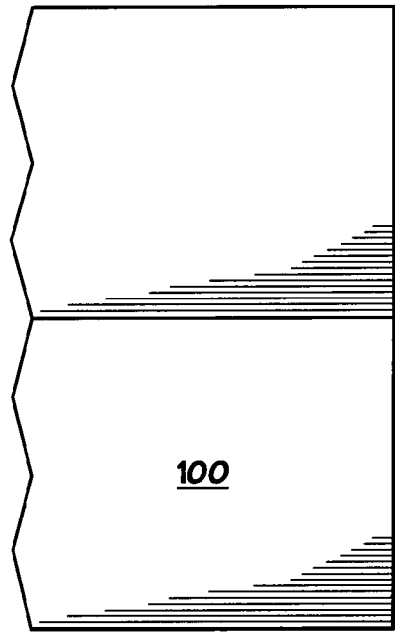
FIG. 10A
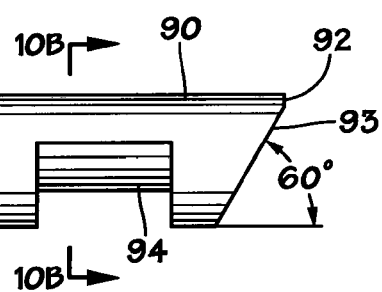
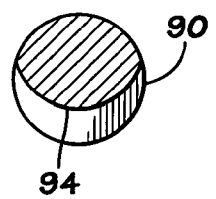
FIG. 10B

VALVE STEM LOCK AND METHODS OF USING SAME

RELATED APPLICATION

This Application claims the benefit, and priority benefit, of U.S. Patent Application Ser. No. 61/789,487, filed Mar. 15, 2013, entitled "Valve Stem Lock and Methods of Using Same".

BACKGROUND OF THE INVENTION

1. Field of the Disclosure

This disclosure is directed to valves and, in particular, to a stem lock for a valve operating stem, or valve stem, to hold the valve stem in the opened position during use as part of devices disposed within an oil, gas, water and/or other types of wells.

2. Description of the Related Art

"Washout" is the erosion of material caused by deviation of flow path through a component such as valve due to the valve being not fully opened. Washout damage can be comparatively minimal at the initiation of erosion, but depending on the pressure of the fluid flowing through the valve, the size of the erosion path, and the erosive or corrosive properties of the fluid flowing through the valve, a small amount of erosion can rapidly destroy a valve's ability to seal such as due to erosion of the valve gate or ball or other internal component of the valve resulting in failure of the valve.

SUMMARY OF INVENTION

Broadly, the devices and methods disclosed herein are directed valve stem locks that, when installed in a valve stem, hold the valve stem in the fully opened position. In one specific embodiment, the device comprises a key that can be releasably engaged with a latch. The latch comprises a locked position and a plurality of disengaged positions. When in the locked position, the latch maintains the valve stem in the fully opened position.

In certain specific embodiments, the valve stem locks may include a plug element having a latch disposed in sliding engagement within a hole disposed in the plug element. The latch may include a hole and is biased in the locked position. The latch may be moved from the locked position to one of a plurality of disengaged positions by inserting a key through a hole disposed in perpendicular arrangement with the hole carrying the latch. The key forces the latch from the locked position toward a fully disengaged position until the hole of the latch is in alignment with the key so that the key is inserted into the hole of the latch. The key includes a notch that, upon further insertion through the hole of the latch, engages the innermost surface of the latch. Upon engagement of the key with the latch, the latch is prevented from returning to its locked position. The key can be removed by rotating the key so that the notch disengages from the lower portion of the latch and sliding the key out of the hole. Thereafter, the latch free to return to its biased, locked, position.

This summary presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

BRIEF DESCRIPTION OF THE DRAWING

The present valve stem lock and method of locking a valve stem may be understood by reference to the following description taken in conjunction with the accompanying drawing, in which:

FIG. 8A is a top view of the latch of the stem lock shown in FIGS. 1-6;

FIG. 8B is a front view of the latch of the stem lock shown in FIGS. 1-6;

FIG. 8C is a right side view of the latch of the stem lock shown in FIGS. 1-6;

FIG. 8D is a perspective view of the latch of the stem lock shown in FIGS. 1-6;

FIG. 8E is a perspective view of the latch of the stem lock shown in FIGS. 1-6;

FIG. 9A is a bottom view of the base element of the stem lock shown in FIGS. 1-6;

FIG. 9B is a right side view of the base element of the stem lock shown in FIGS. 1-6;

FIG. 9C is a back view of the base element of the stem lock shown in FIGS. 1-6;

FIG. 10A is a partial perspective view of the key of the stem lock shown in FIGS. 1-6 with the key manufactured onto the long end of an operating wrench for actuation of the key;

FIG. 10B is a cross-sectional view of the key shown in FIG. 1 OA taken along line 10B-10B.

Figure 1:
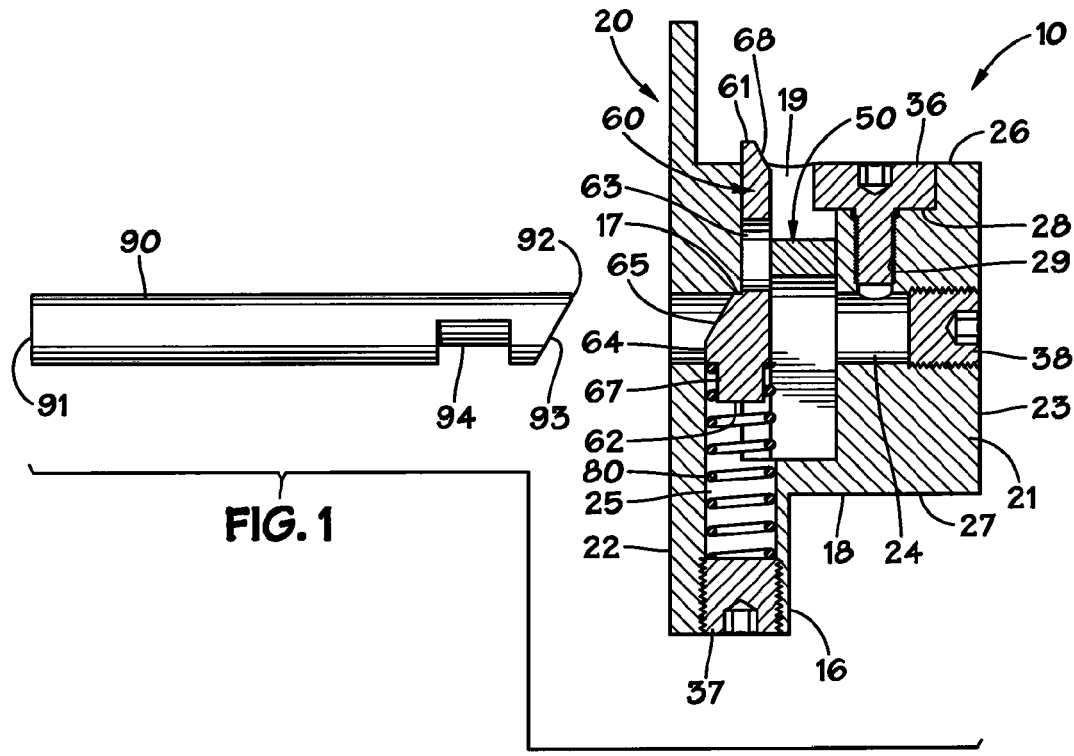
FIG. 1 is a cross-sectional view of one specific embodiment of a stem lock disclosed herein shown in the locked position.

While certain embodiments of the present valve stem lock and method of locking a valve stem will be described in connection with the preferred illustrative embodiments shown herein, it will be understood that it is not intended to limit the invention to those embodiments. On the contrary, it is intended to cover all alternatives, modifications, and equivalents, as may be included within the spirit and scope of the invention as defined by the appended claims. In the drawing figures, the same reference numerals are used throughout the description and in the drawing figures for components and elements having the same structure, and primed reference numerals may be used for components and elements having a similar function and construction to those components and elements having the same unprimed reference numerals.

DETAILED DESCRIPTION OF THE SPECIFIC EMBODIMENTS

Referring now to FIGS. 1-10B, in one specific embodiment, stem lock 10 comprises plug element 20, base element 50, latch 60, biased member 80, and key 90. As shown in FIGS. 1-7G, plug element 20 comprises body 21 having a top surface 22 and a bottom surface 23. Axial hole 24 is disposed through body 21 from top surface 22 through bottom surface 23. Window 19 is disposed through side wall 26 and transverse hole 25 is disposed through side wall 27. As best shown in FIGS. 1-6, 7B and 7F, window 19 and transverse hole are not in complete alignment with each other and, instead, are only partially overlapping. In addition, window 19 includes profile 28 having bore 29. Threads 31, 32, 33 are include in bore 29, at first end 34 of transverse hole 25, and at lower end 35 of axial hole 24, respectively. Threads 31 facilitate installation and retention of retainer screw 36 within bore 29 and thus, profile 28. Threads 32 facilitate installation and retention of set screw 37 within first end 34 of transverse hole 25. Threads 33 facilitate installation and retention of set screw 38 within lower end 35 of axial hole 24.

Window 19 facilitates assembly of stem lock 10 and permits latch 60 to extend out of body 21 of plug element 20 as discussed in greater detail below. Transverse hole 25 facilitates assembly of stem lock 10. Axial hole 24 facilitates grease charging of stem lock 10 and installation/removal of stem lock 10 from the valve stem using key 90 as discussed in greater detail below.

Plug element 20 also includes stop element 16 shown in FIGS. 1-6 and 7A-7G as an angled protuberance extended from top surface 22 toward bottom surface 23. As best shown in FIG. 7G, stop element 16 is disposed between the lines indicated by the 90 degree measurement. Stop element 16 is dimensioned to fit within the stopping surfaces (not shown) of a valve stem (not shown) to maintain the stopping surfaces of the valve stem in their opened positions. Upon being disposed within the stopping surfaces, stem lock 10 can be moved to its locked position.

The outer wall surface of plug 20 toward bottom surface 23 includes a shape or profile that is reciprocal to a slot or hole disposed in a valve stem (not shown). For example, outer wall surface 18 of plug 20 (to the right of latch 60 in FIGS. 1-6) can have a specific thickness with a hexagonal shape (best shown in FIGS. 7C, 7E, and 7G) that allows it to be completely installed into the hexagonal hole of a valve stem (not shown) when the valve is in the opened position. Alternatively, outer wall surface 18 of plug element 20 can have any other shape desired or necessary to be reciprocal to the shape of the hole in the valve stem into which stem lock 10 is to be inserted.

Disposed in sliding engagement partially within transverse hole 25 and partially within window 19 is latch 60. As illustrated in FIGS. 1-6 and 8A-8E, latch 60 comprises first end 61 that is extendible out of window 19 to engage a notch (not shown) disposed in an inner wall of a hole disposed on a valve stem (not shown). As shown in FIGS. 1-6, first end includes angled face 68. Latch 60 also includes a second end 62 and a latch hole 63. In the embodiment shown in the Figures, latch hole 63 is the same size as axial hole 24.

Figure 2:
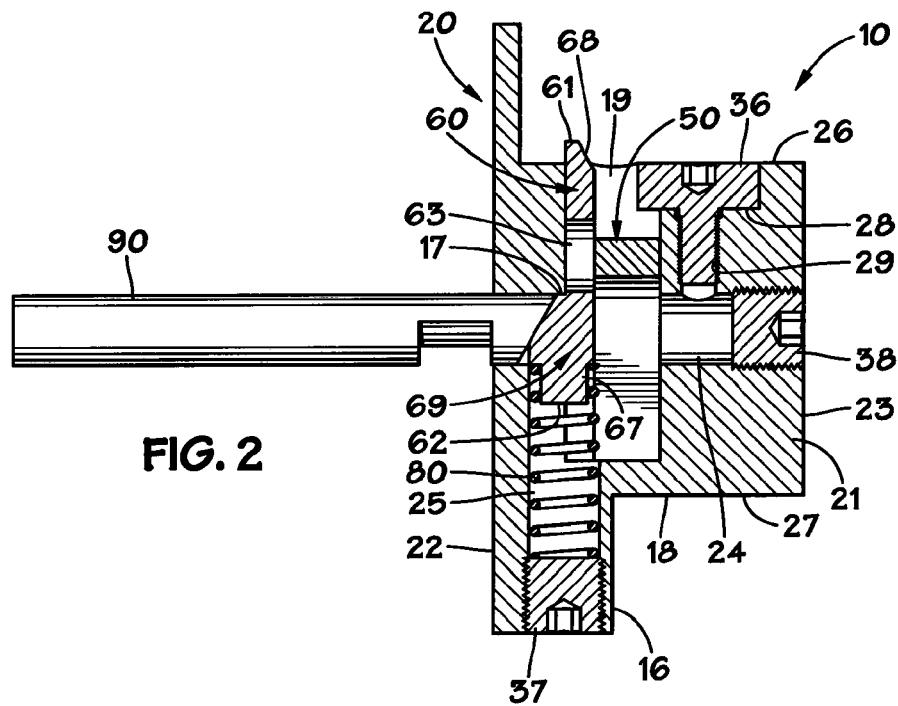
FIG. 2 is cross-sectional view of the stem lock of FIG. 1 showing the stem lock in the locked position at the point the key first engages the latch.

Second end 62 is operatively associated with a biased member 80 that forces latch toward the locked position (FIGS. 1-2) in which the first end 61 extends outwardly from window 19 and engages the notch disposed in the inner wall of the hole in the valve stem. In the embodiment of FIGS. 1-10B, biased member 80 comprises a coiled spring and second end 62 of latch 60 is partially disposed within the center of the coiled spring such that the coiled spring is secured to a lower portion 69 of latch 60 and, in particular to the outer wall surface of lower portion 69 of latch 60 at second end 62. As shown in FIGS. 1-6, latch 60 has cylindrical protuberance 67 at second end 62 that is concentric with the remainder of latch 60 and fits inside the inner diameter of the coiled spring. As shown in FIGS. 1-6, biased member 80 is supported by set screw 37 to provide the necessary biasing action on latch 60 to force latch 60 toward the locked position (FIGS. 1-2). In addition, to avoid inadvertent movement of latch 60 due to shock forces, the coil spring preferably resists the maximum shock expected during operations of the valve stem having stem lock 10, e.g., drilling operations.

To prevent latch 60 from being forced out of window 19 and to remain captured within transverse hole 25 and window 19, transverse hole 25 and window 19 are offset from each other to define shoulder 17. Thus, when in the locked position (FIGS. 1-2), lower portion 69 of latch 60 blocks axial hole 24.

Lower portion 69 of latch 60 includes outer wall surface 64 having angled portion 65. Angled portion 65 facilitates guiding key 90 (discussed in greater detail below) into latch hole 63. Angled portion 65, either alone or together with an additional portion of outer wall surface 64 of latch 60, blocks axial hole 24 when latch 60 is in the locked position (FIGS. 1-2).

Referring to FIGS. 1-6 and 9A-9C, base element 50 comprises front end 51, back end 52, bottom wall 53, top wall 54, outer walls 55, 56, and slot 57 defined by inner walls 58, 59 and curved inner wall portion 49 connecting inner walls 58, 59. As illustrated in FIG. 9C, outer wall outer walls 55, 56, are curved between bottom wall 53 and top wall 54.

Base element 50 is disposed in window 19 and transverse hole 25 to provide support to latch 60 so that latch 60 remains properly oriented within transverse hold 25. As shown in FIGS. 1-6, base element 50 is retained within window 19 and transverse hole 25 by retainer screw 36. As also illustrated in FIGS. 1-6, in this particular embodiment, base element 50 is not fixed, but is permitted, if necessary such as to compensate for air trapped within stem lock 10, to move toward window 19 or toward side 27. FIGS. 1-2 show base element 50 moved to its furthest point toward side 27 and FIGS. 3-6 show base element moved to its furthest point toward window 19, i.e., contacting retainer screw 36. Despite being able to move, axial hole 24 is never blocked by base element 50 such that key 90 cannot be inserted into slot 57 (FIG. 9A).

Referring now to FIGS. 1-6 and 10A-10B, key 90 includes first end 91, second end 92 having angled portion 93, and notch 94. Angled portion 93 facilitates engagement of second end 92 of key 90 with angled portion 65 of latch 60. Key 90 has an outer diameter that is slightly smaller than the inner diameter of axial hole 24. As illustrated in FIGS. 10A-10B, first end 91 (not shown in FIGS. 10A-10B) is manufactured with operating wrench 100 that is used to insert and actuate key 90 and, thus, actuate the valve stem.

As discussed above, stem lock 10 is designed to be used on fluid control valves to keep the operating or valve stem of the valve in the opened position. During assembly, base element 50 is installed within window 19 and transverse hole 25 after latch 60 has been installed in window 19 and transverse hole 25. In so doing, base element 50 keeps latch 60 inside window 19 and transverse hole 25 so that the coil spring forces latch 60 in the locked position.

In order to guard against drilling and other corrosive or damaging fluids invading stem lock 10 when the valve on which valve stem 10 is installed is being used in an oil, gas or other type of well, stem lock 10 is "charged" or filled with grease. After assembly of plug element 20, latch 60, base element 50, and retainer screw 36, a grease insert is installed into the threaded section (lower end 35) of axial hole 24 and a grease gun is attached and stem lock 10 is filled with grease. After grease extrudes from transverse hole 25 in plug element 20, the coil spring is inserted and set screw 37 is installed in the threaded section of transverse hole 25. More grease is then pumped into stem lock 10 through the threaded section (lower end 35) of stem lock 10 to remove any trapped air. The grease insert is removed and set screw 38 is installed in the threaded section (lower end 35) of axial hole 24. Stem lock 10 is now complete and ready for use.

During installation of stem lock 10 in a stem valve, stem lock 10 is pushed into the hole in the valve stem. In so doing, latch 60 is pushed into window 19 and transverse hole 25 and the coiled spring is compressed or energized. Upon being aligned with a notch in the hole of the valve stem, the coiled spring will release its stored energy and expand causing first end 61 of latch 60 to exit window 19 and transverse hold 25 and engage with, and lock into, the notch in the hole of the valve stem. As a result, the valve stem is locked in its opened position and, thus, restricted from moving to its closed position. Accordingly, partially closing of the valve during operation of the valve is restricted and, thus, the likelihood of washout of the valve is decreased.

Figure 3:
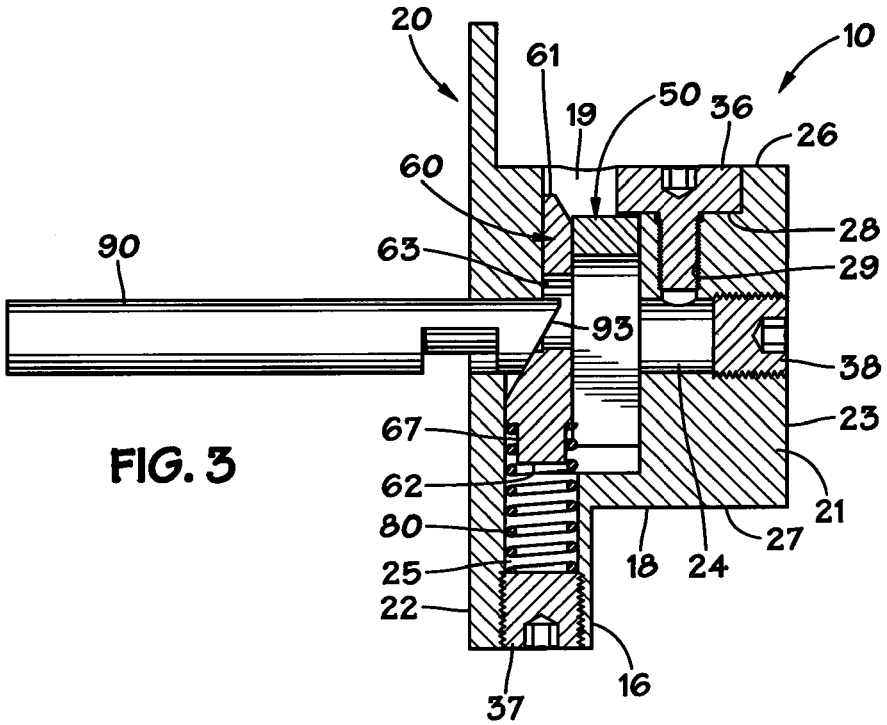
FIG. 3 is a cross-sectional view of the stem lock of FIG. 1 showing the latch being moved from the locked position toward the fully disengaged position by insertion of the key into the latch.
Figure 4:
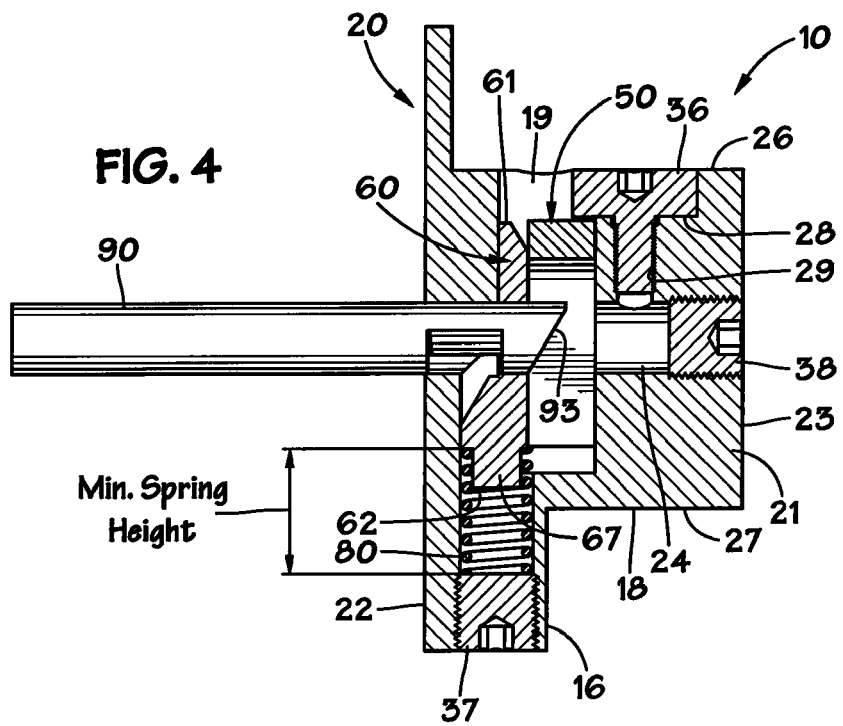
FIG. 4 is a cross-sectional view of the stem lock of FIG. 1 showing the latch disposed at its fully disengaged position due to insertion of the key into the latch.

When the valve requires closure, key 90, which can be attached to the end of the valve operating wrench (see FIGS. 10A-10B), is inserted into axial hole 24 with angled portion 93 aligned with angled portion 65 of latch 50 and with notch 94 facing toward set screw 37 disposed in transverse hole 25. Angled portion 93 engages angled portion 65 and as key 90 is inserted further into axial hole 24, latch 60 is moved away from the locked position (FIGS. 1-2) toward the fully disengaged position (FIG. 4). FIG. 3 shows the transition position of latch 60 between the views in FIGS. 1-2 and the view in FIG. 4. During this step, angled portion 93 also facilitates piercing any dried debris such as drilling fluid that may have collected in axial hole 24. Movement of latch 60 from the locked position toward the fully disengaged position (FIG. 4) disengages first end 61 of latch 60 from the notch (not shown) disposed on the inner wall of the hole disposed on the valve stem (not shown).

Figure 5:
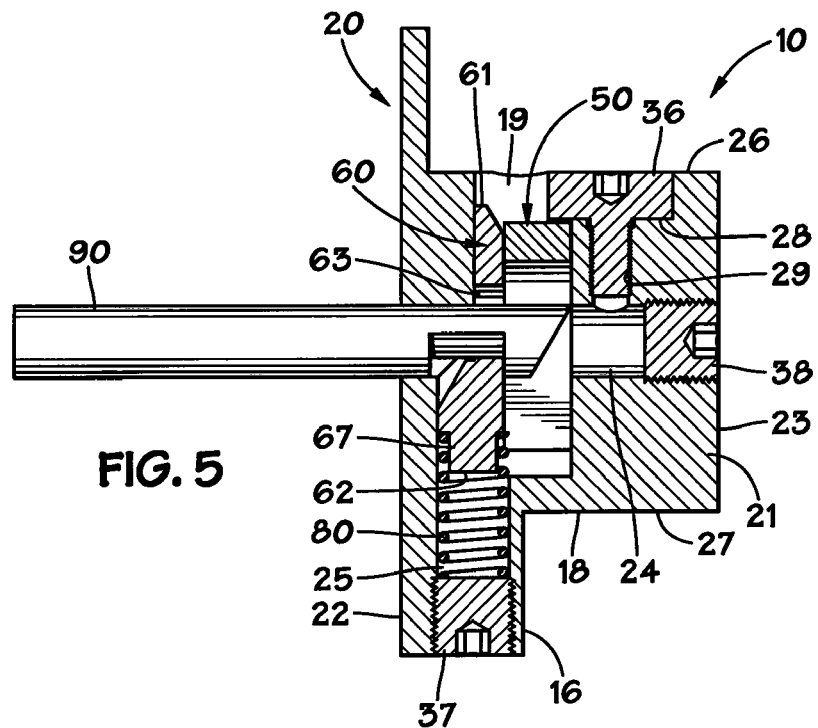
FIG. 5 is a cross-sectional view of the stem lock of FIG. 1 showing the latch being held in a disengaged position by the key.

Key 90 is further inserted into axial hole 24 until notch 94 is aligned with lower portion 69 of latch 60. At this point in time, the coiled spring forces lower portion 69 of latch 60 into notch 94. During engagement of lower portion 69 with notch 94, movement of latch 60 toward the locked position (FIGS. 1-2) is not sufficient enough for first end 61 of latch 60 to re-engage the notch disposed within the hole of the valve stem. FIG. 5 shows the position of latch 60 during engagement of lower portion 69 with notch 94 in key 90. With key 90 engaged with latch 60 as shown in FIG. 5, stem lock 10 can be removed from the hole in the valve stem, such as by pulling on key 90 toward the left in FIGS. 1-6. After removal of stem lock 10 from the hole disposed in the valve stem, the valve stem can be actuated to close the valve.

Figure 6:
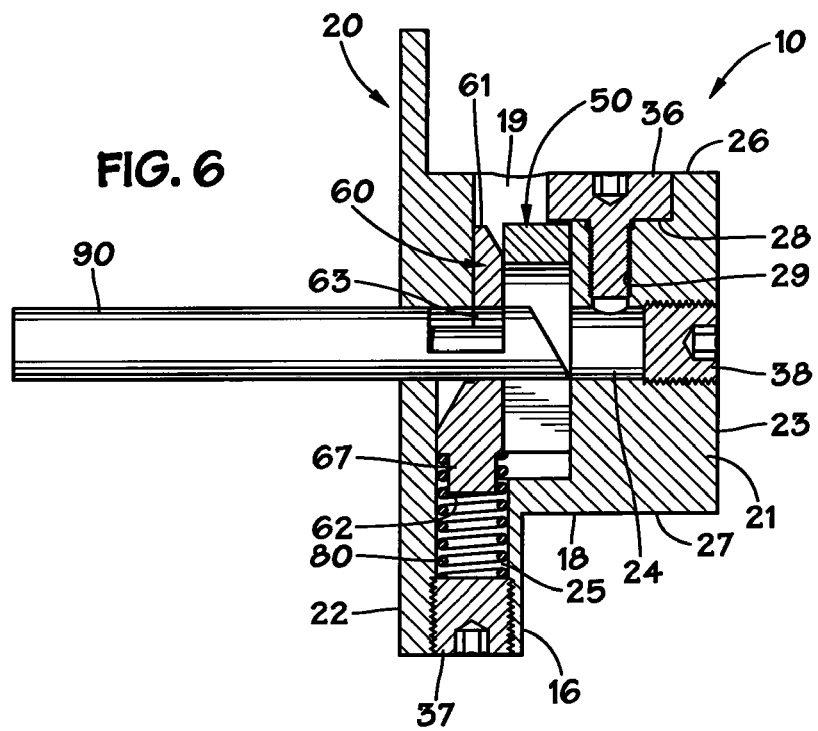
FIG. 6 is a cross-sectional view of the stem lock of FIG. 1 showing the key rotated to disengage the key from the latch so that the key can be removed from the stem lock and, thus, so that the latch can move to its locked position.
Figure 7A:
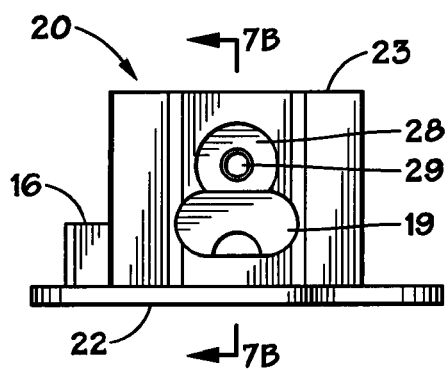
FIG. 7A is a front view of the plug element of the stem lock shown in FIGS. 1-6.
Figure 7B:
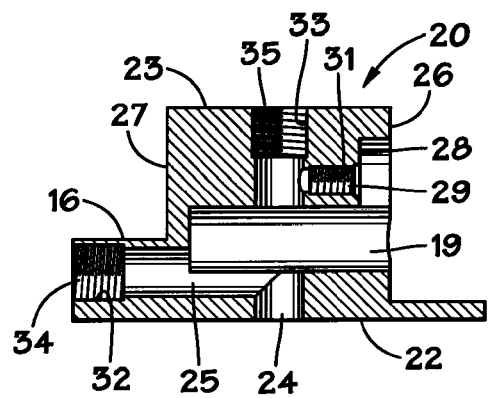
FIG. 7B is a cross-sectional view of the plug element of the stem lock shown in FIGS. 1-6.
Figure 7C:
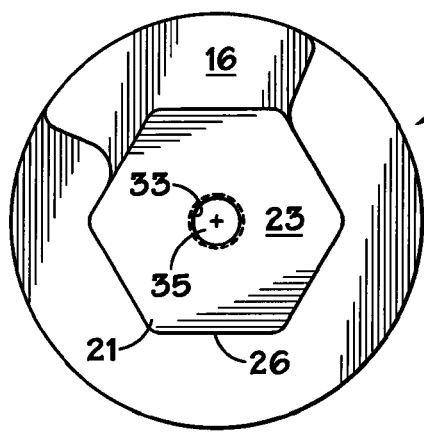
FIG. 7C is a bottom view of the plug element of the stem lock shown in FIGS. 1-6.
Figure 7D:
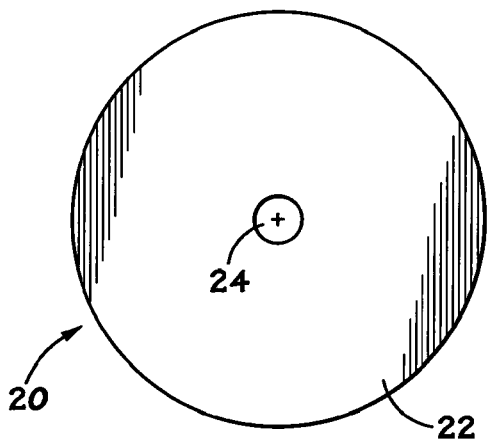
FIG. 7D is a top view of the plug element of the stem lock shown in FIGS. 1-6.
Figure 7E:
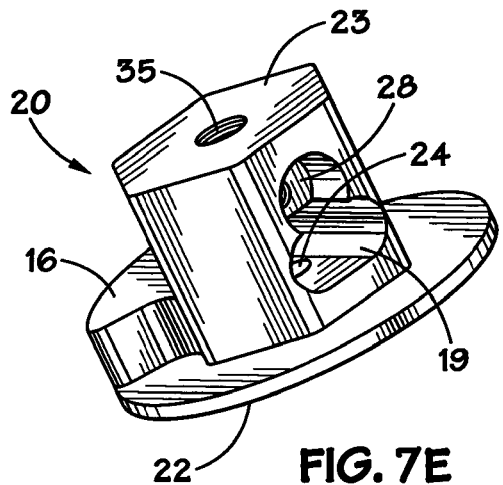
FIG. 7E is a perspective view of the plug element of the stem lock shown in FIGS. 1-6.
Figure 7F:
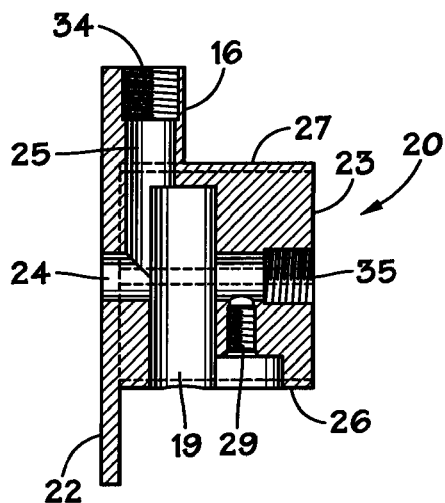
FIG. 7F is a right side view with hidden lines of the plug element of the stem lock shown in FIGS. 1-6.
Figure 7G:
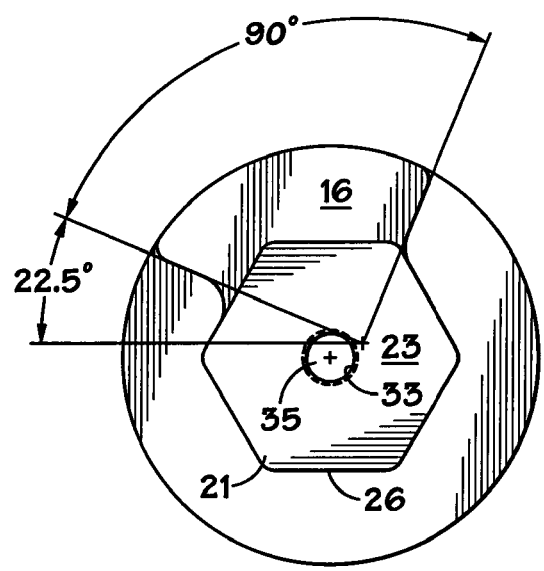
FIG. 7G is bottom view of the plug element of the stem lock shown in FIGS. 1-6.

In embodiments such as those shown in FIGS. 1-10B, and as illustrated in FIG. 6, key 90 can be rotated, for example, 180 degrees, to disengage notch 94 from lower portion 69 of latch 60 so that key 90 can be removed. As a result, latch 60 returns to the locked position (FIGS. 1-2) through the release of stored energy by the biased member 80.

Because first end 61 of latch 60 includes angled face 68, key 90 is not required to be used to install stem lock on a stem valve. Instead, movement of stem lock 10 toward the right in FIGS. 1-6 into a hole (not shown) disposed in a valve stem (not shown) will cause angled face 68 to engage an inner wall of the hole of the valve stem causing latch 60 to move from its locked position toward the fully disengaged position until first end 61 is aligned with the notch in the hole in the valve stem. At this point in time, coiled spring will release its stored energy and force latch 60 toward the locked position and, thus, first end 61 into the notch in the hole of the valve stem.

After each removal of stem lock 10 from a valve, stem lock 10 should be "re-charged" with grease following the same procedures described above. Such recharging is desired or necessary because use of stem lock 10 in a drilling environment may expose stem lock 10 to cuttings from the well bottom or to corrosive or other damaging materials or fluids. It is to be understood, however, that if stem lock 10 is not used in such damaging environments, recharging stem lock 10 may not be necessary.

In addition, due to the potential damaging environments in which stem lock 10 may be used, all components of stem lock 10 are preferably formed from NACE-compliant materials with high toughness to maintain the integrity of stem lock 10.

It is to be understood that the invention is not limited to the exact details of construction, operation, exact materials, or embodiments shown and described, as modifications and equivalents will be apparent to one skilled in the art. Accordingly, the invention is therefore to be limited only by the scope of the appended claims.

Specific embodiments of the present valve stem lock and method of locking a valve stem have been described and illustrated. It will be understood to those skilled in the art that changes and modifications may be made without departing from the spirit and scope of the inventions defined by the appended claims.

What is claimed is:

1. A valve stem lock assembly comprising:
   a plug element, the plug element having a body having a top surface, a bottom surface, a first side surface, a second side surface, an axial hole disposed through the top surface, a window disposed through the first side surface, and a transverse hole disposed through the second side surface,
   wherein the window and transverse hole are in partial, but not complete, alignment with each other;
   a latch in sliding engagement with a portion of the window and a portion of the transverse hole, the latch having a first end, a hole disposed through the latch, a locked position, and a plurality of disengaged positions,
   wherein the first end extends outwardly through the window when the latch is in the locked position; and
   a key having a first end, a second end, and a key profile for engaging with a portion of the latch when the key is inserted through the hole disposed through the latch.

2. The valve stem lock assembly of claim 1, wherein the latch is biased toward the locked position by a biased member.

3. The valve stem lock assembly of claim 2, wherein the biased member comprises a coiled spring.

* * * * *